United States Patent
Kikuchi

(10) Patent No.: US 11,433,729 B2
(45) Date of Patent: Sep. 6, 2022

(54) SUSPENSION CONTROL METHOD AND SUSPENSION CONTROL SYSTEM

(71) Applicant: Nissan Motor Co., Ltd., Yokohama (JP)

(72) Inventor: Hironobu Kikuchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/439,430

(22) PCT Filed: Mar. 25, 2019

(86) PCT No.: PCT/JP2019/012522
§ 371 (c)(1),
(2) Date: Sep. 15, 2021

(87) PCT Pub. No.: WO2020/194451
PCT Pub. Date: Oct. 1, 2020

(65) Prior Publication Data
US 2022/0176766 A1    Jun. 9, 2022

(51) Int. Cl.
*B60G 17/018*    (2006.01)
*B60G 17/016*    (2006.01)

(52) U.S. Cl.
CPC ......... *B60G 17/018* (2013.01); *B60G 17/016* (2013.01); *B60G 2400/10* (2013.01); *B60G 2400/206* (2013.01); *B60G 2500/10* (2013.01)

(58) Field of Classification Search
CPC ................ B60G 17/018; B60G 17/016; B60G 2400/10; B60G 2400/206; B60G 2500/10
See application file for complete search history.

(56) References Cited

U.S. PATENT DOCUMENTS 5,322,320 A * 6/1994 Sahashi ................ B60G 17/018
                                            280/5.515
5,327,983 A   7/1994 Yoshioka et al.
(Continued)

FOREIGN PATENT DOCUMENTS

CN    101932462 A    12/2010
CN    102325662 A    1/2012
(Continued)

OTHER PUBLICATIONS

Karnopp et al., "Vibration Control Using Semi-Active Force Generations", Journal of Engineering for Industry, May 1974, pp. 619-626, vol. 96, No. 2, ASME, New York.

*Primary Examiner* — Drew J Brown
(74) *Attorney, Agent, or Firm* — Global IP Counselors, LLP

(57) ABSTRACT

A control device applies a target control force to a variable damping force damper in a suspension mechanism based on a damping coefficient of the variable damping force damper to eliminate unsprung tramp sensations and feelings of hardness when the stroke speed decreases in a conventional skyhook control. The control device includes a state estimation unit for calculating the sprung mass speed of the sprung mass based on a value detected by several of a plurality of sensors, an application control unit for calculating and outputting a damping coefficient of the variable damping force damper based on the calculated sprung mass speed, and a target control amount management unit for determining the target control force based on the damping coefficient output by the application control unit.

15 Claims, 14 Drawing Sheets

(56) References Cited

U.S. PATENT DOCUMENTS

| | | |
|---|---|---|
| 9,073,398 B2 | 7/2015 | Kikuchi et al. |
| 9,375,990 B2 | 6/2016 | Kanda |
| 9,428,026 B2 | 8/2016 | Kubota et al. |
| 2017/0326936 A1* | 11/2017 | Saito .................... B60G 17/018 |

FOREIGN PATENT DOCUMENTS

| | | | | |
|---|---|---|---|---|
| CN | 109715421 A * | 5/2019 | ........... | B60G 17/015 |
| DE | 4205223 A1 * | 9/1992 | | |
| DE | 4225219 A1 * | 2/1993 | ........... | B60G 17/018 |
| DE | 19509853 C2 * | 1/2002 | ........... | B60G 17/015 |
| EP | 2868499 A1 * | 5/2015 | ........... | B60G 17/016 |
| JP | 5-104927 A | 4/1993 | | |
| JP | 5-208609 A | 8/1993 | | |
| JP | 2011-213198 A | 10/2011 | | |
| JP | 2013-189154 A | 9/2013 | | |
| JP | 2016-22830 A | 2/2016 | | |
| JP | 2019-1369 A | 1/2019 | | |
| JP | 2019-14371 A | 1/2019 | | |
| WO | 2013/111504 A1 | 8/2013 | | |
| WO | 2014/142270 A1 | 9/2014 | | |

* cited by examiner

SUSPENSION CONTROL METHOD AND SUSPENSION CONTROL SYSTEM

CROSS-REFERENCE TO RELATED APPLICATIONS

This application is a U.S. national stage application of International Application No. PCT/JP2019/012522, filed on Mar. 25, 2019.

BACKGROUND

Technical Field

The present invention relates to a suspension control method and suspension control system.

Background Information

Skyhook control achieved by means of a variable damping force damper provided in a suspension mechanism is a known technology for controlling vehicle vibration. Skyhook control is a technique for controlling the damping force of a variable damping force damper based on the relationship between sprung speed and stroke speed (damper speed) in a suspension mechanism.

In conventional skyhook control, if vibration (motion) in the vicinity of an unsprung resonance frequency having a high change speed is applied from a road surface, etc., to a wheel (unsprung mass) while a vehicle body (sprung mass) is in motion in a state in which changes in the sprung mass speed are small, the convergent property in controlling the attitude of the vehicle body is low and the sprung vibration does not converge, which affects ride comfort; therefore, a technology such as that disclosed in Japanese Laid-Open Patent Application No. 2011-213198 (Patent Document 1) below has been proposed.

That is, the technology disclosed in Japanese Laid-Open Patent Application No. 2011-213198 (Patent Document 1) concerns a control device of a variable damping force damper that performs skyhook control for setting an actual damping force lower than a target damping force when a sprung mass speed and a damper speed are in opposite directions, wherein the deviation between the target damping force and the actual damping force is calculated and the target damping force is gain-corrected based on the deviation in order to improve the convergent property in controlling the attitude of the vehicle body and ride comfort.

SUMMARY

However, since the technology disclosed in the above-described Japanese Laid-Open Patent Application No. 2011-213198 uses gain correction based on Karnopp's law, when the sign of the sprung mass speed and the sign of the stroke speed do not match, the actual damping force is not applied to the target damping force (target control force), and an impression of "something missing" remains, so that even if the gain correction were carried out, it would not be possible to suppress a so-called "tramp sensation," particularly a "tramp sensation" due to unsprung mass vibrations while the stroke speed is reduced.

Thus, in view of the problem described above, an object of the present invention is to provide a suspension control method and a suspension control system that are an improvement over conventional skyhook control.

More specifically, an object of the present invention is to provide a suspension control method and a suspension control system that solve the problem of "feeling of hardness" that occurs as a result of the non-convergence of unsprung vibrations, which accompanies a "tramp sensation" caused by insufficiently damped unsprung resonance phenomenon.

The present invention for solving the problem described above is configured to include the following invention-specific matters or technical features. That is, the present invention according from one standpoint is a suspension control method in a suspension control system that includes a suspension mechanism that is provided between a sprung mass and an unsprung mass, and includes an elastic body and a variable damping force damper. The control method described above may include calculating the sprung mass speed based on a value detected by at least one of a plurality of sensors, calculating and outputting a damping coefficient of the variable damping force damper based on the calculated sprung mass speed, determining a target control force based on the output damping coefficient, and applying the determined target control force to the variable damping force damper. The determination of the target control force can then be carried out, under a first condition, based on a damping coefficient held in advance.

As a result, the damping coefficient is temporarily held, and it is thereby possible to carry out attitude control by applying the damping force (control force) to the unsprung mass, without depending on the current stroke speed.

By means of the present invention, it is possible to solve the problem of "feeling of hardness" that occurs as a result of unsprung vibration not converging, which accompanies a "tramp sensation" caused by undamped unsprung resonance.

The other technical features, objects, actions, effects, and advantages of the present invention should become apparent from the following embodiments, described with reference to the appended drawings. In addition, the objects, actions and effects in the present disclosure are examples, and are not restricted thereby.

BRIEF DESCRIPTION OF THE DRAWINGS

Referring now to the attached drawings which form a part of this original disclosure.

DETAILED DESCRIPTION OF EMBODIMENTS

Figure 1:
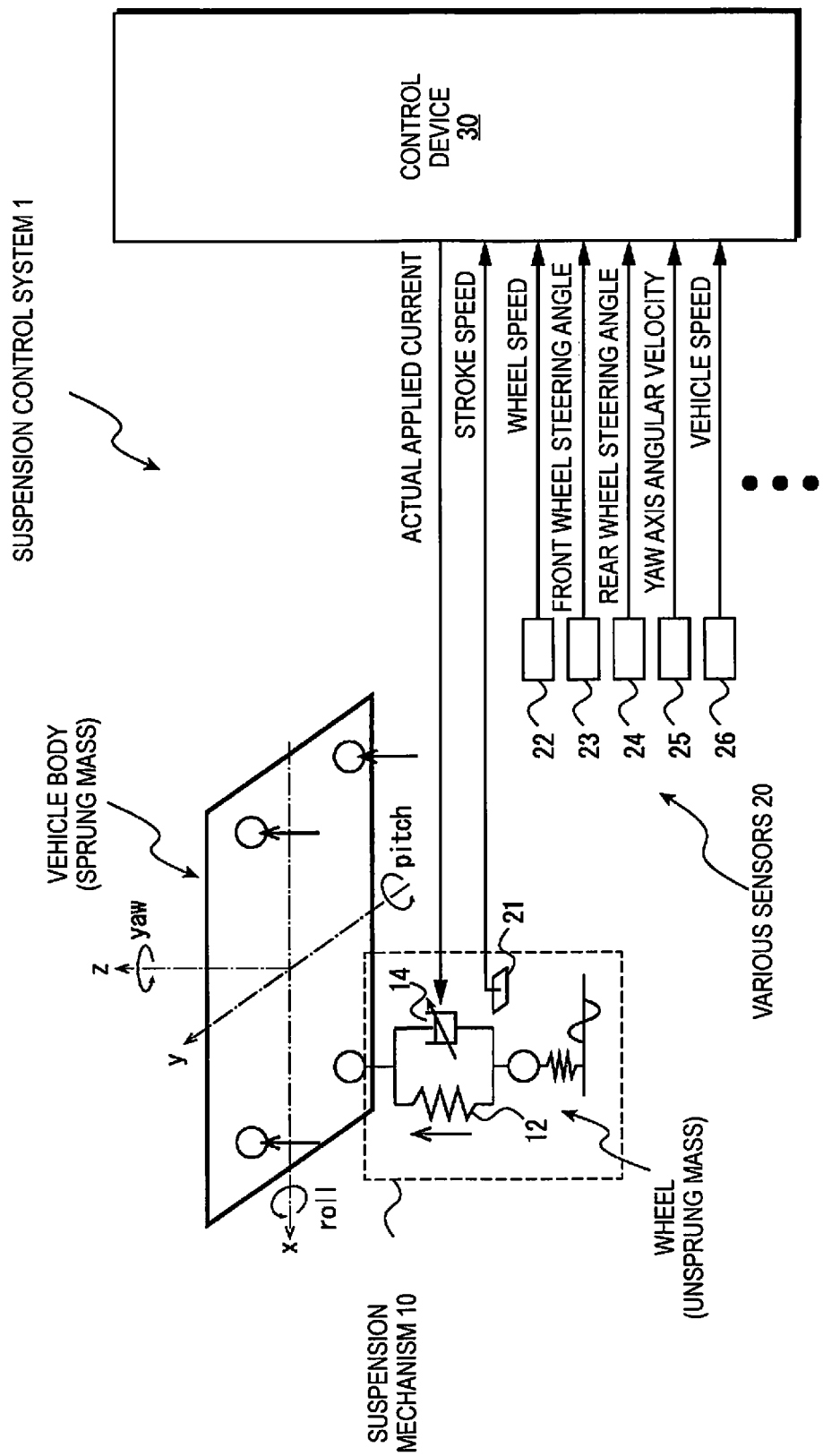
FIG. 1 is a block diagram explaining one example of a configuration of a suspension control system according to one embodiment of the present invention.

Embodiments of the present invention will be described below with reference to the drawings. However, the embodiments described below are merely examples and are not intended to exclude the application of various modifications and techniques not specified below. Various modifications (such as by combination of the embodiments) may be made without departing from the essence of the present invention. In addition, in the description of the following drawings, identical or similar parts have been assigned the same or similar reference symbols. The drawings are schematized and do not necessarily match the actual dimensions and proportions. Parts with different relationships and proportions of dimensions may also be included between drawings. In the drawings, constituent elements particularly related to the technique according to the present disclosure are illustrated, and other constituent elements are omitted as needed for ease of understanding, but as long as they are obvious to a person skilled in the art, constituent element that are not shown should not be excluded.

First Embodiment

In the present embodiment, a suspension control system is disclosed which realizes skyhook control by means of application or non-application of Karnopp's law in the skyhook control, depending on the relationship between a prescribed sprung mass speed and a prescribed stroke speed, obtained based on signals detected and output by various sensors.

FIG. 1 is a block diagram explaining one example of the configuration of a suspension control system according to one embodiment of the present invention. In the figure, constituent elements particularly related to the technique according to the present disclosure are illustrated, and other constituent elements are omitted as necessary for ease of understanding. Hereinbelow, an example is described in which a suspension control system 1 according to the present embodiment is applied to a four-wheeled vehicle, but no limitation is imposed thereby and the suspension control system 1 can be applied to various types of vehicles.

The suspension control system 1 is a device for variably controlling the damping force of an actuator in a suspension mechanism 10 provided between the unsprung mass (axle, wheels, etc.) and the sprung mass (vehicle body, etc.) of a vehicle, based on state quantities and/or output signals of various sensors. Typically, the suspension mechanism 10 is composed of a coil spring 12 and a variable damping force damper 14. Typically, the variable damping force damper 14 is an actuator that can control the damping force by means of electromagnetic control. The suspension mechanism 10 is provided for each of the four wheels, but only one representative is shown in the drawing for the sake of simplicity.

The suspension control system 1 can be composed of a control device 30 and various sensors 21-26 (hereinafter may be collectively referred to as "sensor 20") related to travel control of the vehicle. In the present embodiment, a stroke sensor 21 is provided. Further, in the figure, a wheel speed sensor 22, a front wheel steering angle sensor 23, a rear wheel steering angle sensor 24, a yaw axis angular velocity sensor 25, and a vehicle speed sensor 26 are shown as other sensors.

The stroke sensor 21 is a sensor provided in the suspension mechanism 10 of each wheel in order to detect the speed of the suspension stroke (hereinafter referred to as "stroke speed") in the suspension mechanism 10. The stroke sensor 21 outputs a signal corresponding to the detected stroke speed to the control device 30. As described as another example, the stroke speed can be calculated or estimated using a value (such as wheel speed, yaw rate, lateral acceleration, steering angle and/or vehicle speed) detected by various sensors other than the stroke sensor 21. The stroke sensor 21 outputs a signal corresponding to the detected stroke speed to the control device 30.

The wheel speed sensor 22 is provided on each wheel and detects the rotational speed (wheel speed) of the wheel. Typically, the wheel speed sensor 22 is provided on all four of the wheels, but may be provided on only some of the four wheels. The wheel speed sensor 22 outputs a signal corresponding to the detected wheel speed to the control device 30. As described further below, the wheel speed can be used for calculating the sprung mass speeds (bounce rate, roll rate, and pitch rate).

The front wheel steering angle sensor 23 is provided in a steering mechanism of the front wheels of the vehicle, which is not shown, and detects the front wheel steering angle corresponding to the steering operation amount of the driver. The front wheel steering angle sensor 23 outputs a signal corresponding to the detected front wheel steering angle to the control device 30.

The rear wheel steering angle sensor 24 is provided in a steering mechanism of the rear wheels of the vehicle, which is not shown, and detects the rear wheel steering angle. Typically, the rear wheel steering angle can be determined in accordance with the amount of steering operation by the driver and/or the vehicle speed. The front wheel steering angle sensor 23 outputs a signal corresponding to the detected front wheel steering angle to the control device 30.

The yaw axis angular velocity sensor 25 detects the angular velocity about the vertical axis of the vehicle by means of a gyroscope, for example. The yaw axis angular velocity sensor 25 outputs a signal corresponding to the detected yaw axis angular velocity (yaw rate) to the control device 30.

The vehicle speed sensor 26 detects the vehicle speed of the vehicle. The vehicle speed sensor 26 outputs a signal corresponding to the detected vehicle speed to the control device 30.

In the present disclosure, sensors other than the sensors described above are not shown, but, as is obvious to a person skilled in the art, sensors necessary for the actual travel control of a vehicle, such as a lateral acceleration sensor, an engine torque sensor, and an engine rotational speed sensor are also provided. In addition, as shown in the other embodiments, a sprung mass acceleration sensor and an unsprung mass acceleration sensor can also be provided.

The control device 30 calculates a target control amount of the variable damping force damper based on state quantities and/or output signals of various sensors 20, and controls the damping force of the variable damping force damper 14 by outputting a command signal corresponding to the target control amount.

Figure 2:
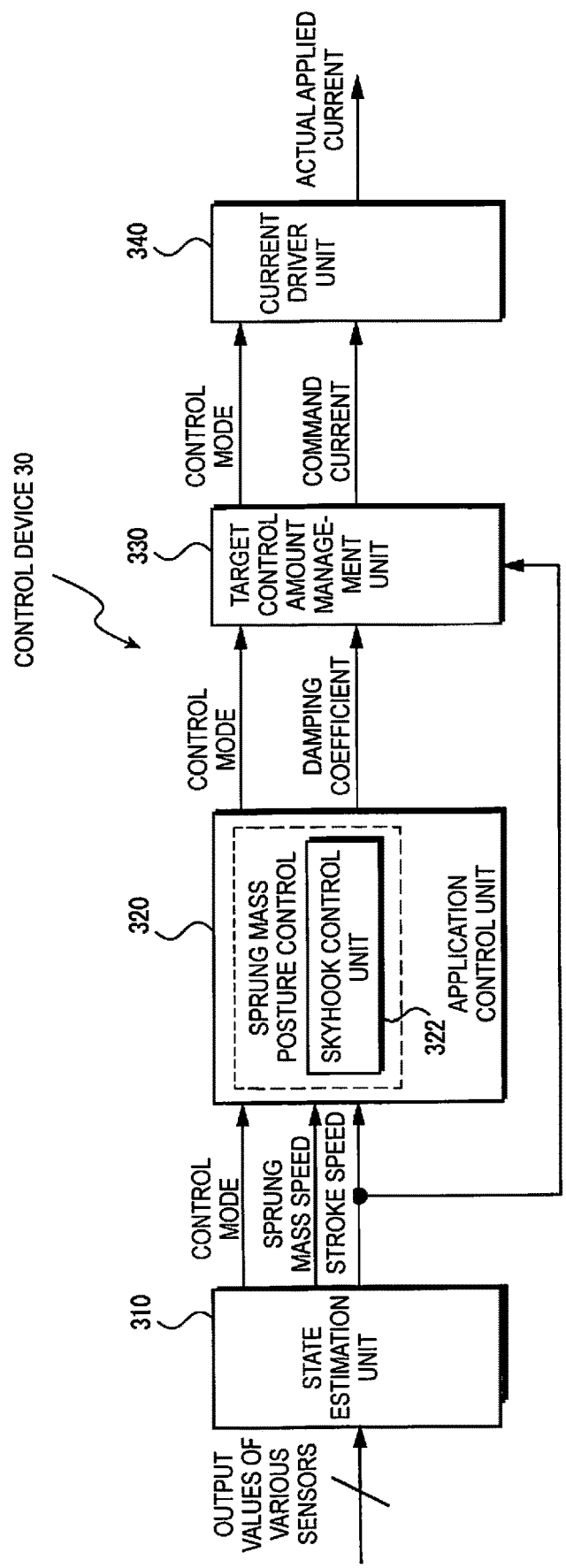
FIG. 2 is a block diagram explaining one example of a configuration of a control device in the suspension control system according to one embodiment of the present invention.

FIG. 2 is a block diagram explaining one example of the configuration of the control device in the suspension control system according to one embodiment of the present invention. As shown in the figure, schematically, the control device 30 can be composed of, for example, a state estimation unit 310, an application control unit 320, a target control amount management unit 330, and a current driver unit 340.

The state estimation unit 310 calculates the stroke speed of each wheel in the suspension mechanism 10 based on a signal output from the stroke sensor 21 of each wheel, and uses a prescribed estimation model to estimate, and output, each of the sprung mass speeds (bounce rate, roll rate, and pitch rate) at positions above the springs corresponding to the suspension mechanism 10, based on the calculated stroke speeds. In the present embodiment, the stroke speed and the sprung mass speed are used for skyhook control in the application control unit 320, described further below.

That is, in the present embodiment, the state estimation unit 310 calculates the stroke speed of each wheel based on the value output from the stroke sensor 21 of each wheel, and then uses a prescribed estimation model and calculates the bounce rate, the roll rate, and the pitch rate for the skyhook control, based on the calculated stroke speeds.

For example, the following estimation formula of an active skyhook model can be used as the prescribed estimation model.

$$dz2 = G \cdot (dz2 - dz1)$$

However, $G = -(1/s) \cdot \{1/s + C_{sky}/Ms)\} \cdot \{(Cs/Ms)s + (Ks/Ms)\}$, z1 represents the unsprung mass position, z2 represents the sprung mass position, s represents the Laplace operator, Csky represents a virtual damping coefficient, Ms represents the sprung mass, Cs represents the damping coefficient of the variable damping force damper 14, and Ks represents the elastic coefficient of the coil spring. In addition, dz1 is a first derivative, that is, the unsprung mass speed, and dz2 is a first derivative of z2, that is, the sprung mass speed.

In addition, if B, R, and P are values that respectively consider the modal parameters (CskyB, CskyR, CskyP, CsB, CsR, CsP, KsB, KsR, KsP) corresponding to the bounce term, roll term, and the pitch term of each of Csky, Cs, and Ks, then the bounce rate dB, the roll rate dR, and the pitch rate dP are calculated by means of the following equations.

$$dB = GB \cdot dxsB$$

$$dR = GR \cdot dxsR$$

$$dP = GP \cdot dxsP$$

However, dxsB, dxsR, and dxsP are first derivatives of the bounce term, roll term, and the pitch term of the stroke amount, respectively.

In this manner, the state estimation unit 310 estimates the bounce rate, the roll rate, and the pitch rate for the skyhook control as the sprung mass speeds. In the present disclosure, the sprung mass speed is estimated by means of a prescribed estimation model, but no limitation is imposed thereby, and the suspension control system 1 may be configured such that, for example, one or more sprung mass speed sensors are provided on the vehicle body, and the sprung mass speed is acquired based on signals output from the sprung mass speed sensors.

The application control unit 320 can be composed of a sprung mass attitude control unit that functions as a skyhook control unit 322, for example. Although not shown, the application control unit 320 can further include a frequency sensitive control unit, an unsprung mass control unit, a vehicle speed sensitive control unit, and the like.

The skyhook control unit 322 determines a damping coefficient for enabling skyhook control based on the sprung mass speed and the stroke speed calculated by the state estimation unit 310. In addition to the conventional control by means of a damping coefficient following Karnopp's law, the skyhook control referred to in the present disclosure includes control by means of a specific damping coefficient in a state in which the application of Karnopp's law is stopped under prescribed conditions, as will be described further below. The damping coefficient is, for example, set virtually between each degree of freedom of motion of sprung bounce, roll, and pitch, or, a damping coefficient virtually set between the degree of freedom of vertical movement of at least any three points on a plane above the springs having different coordinates.

The target control amount management unit 330, in consideration of the prescribed control mode, a human sense of vehicle speed, sense of vibration with respect to each direction of movement of bounce/roll/pitch, and the like, corrects and/or adjusts the target control force with respect to the suspension mechanism 10, and calculates the final target control force. The target control force is expressed as a prescribed damping rate (sometimes referred to as "damping coefficient saturation") that depends on the damping coefficient. In this sense, the damping rate can be understood as one example of the damping coefficient. The target control amount management unit 330 outputs a command current corresponding to the calculated target control force to the current driver unit 340.

The current driver unit 340 receives the command current provided by the target control amount management unit 330, and, while correcting a voltage application period such that the actual applied current with respect to the variable damping force damper 14 follows the command current, supplies the actual applied current to the variable damping force damper 14, based on the deviation of the actual applied current and the current duty ratio.

As described above, as another example, the stroke speed can be calculated based on variously valued outputs from other sensors, without using the stroke sensor 21. Specifically, although not shown, a stroke speed calculation unit, provided for each wheel, first calculates a reference wheel speed based on the wheel speed, front wheel steering angle, rear wheel steering angle, lateral acceleration, and yaw rate, obtained from various sensors. The reference wheel speed is a value in which various external disturbances are removed from the wheel speed. The stroke speed calculation unit then calculates a tire rotation vibration frequency based on the calculated reference wheel speed, and calculates the deviation between the wheel speed and the reference wheel speed (wheel speed variation). The deviation between the wheel speed and the reference wheel speed is a value related to a component that fluctuates in accordance with the stroke generated due to the bounce behavior, roll behavior, and pitch behavior of the vehicle body, or vertical unsprung vibrations. Thus, the stroke speed calculation unit then converts and corrects the calculated deviation to a stroke amount, applies a band stop filter corresponding to the calculated tire rotation vibration frequency to the corrected stroke amount to eliminate tire rotation primary vibration component, and calculates the final stroke speed.

Figure 3:
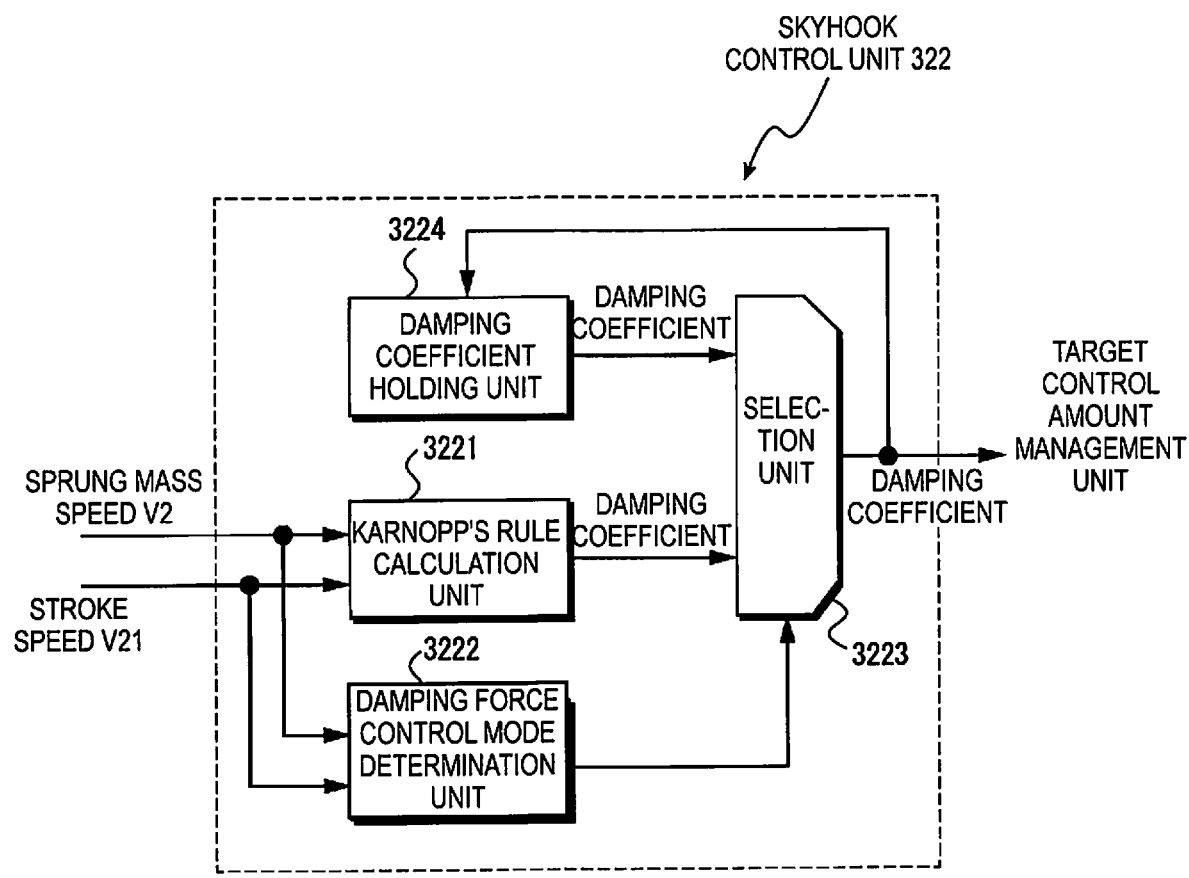
FIG. 3 is a block diagram showing one example of a configuration of a skyhook control unit of the control device in the suspension control system according to one embodiment of the present invention.

FIG. 3 is a block diagram showing one example of a configuration of a skyhook control unit of the control device in the suspension control system according to one embodiment of the present invention. As shown in the figure, the skyhook control unit 322 according to the present embodiment can include, for example, a Karnopp's law calculation unit 3221, a damping force control mode determination unit 3222, a selection unit 3223, and a damping coefficient holding unit 3224. As is clear from the description below, in the present disclosure, by calculating a damping coefficient by means of a prescribed method is held, and using the previously held damping coefficient at a prescribed timing, it is possible to achieve flexible skyhook control.

The Karnopp's law calculation unit 3221 applies the Karnopp's law and dynamically calculates the damping coefficient for the skyhook control based on the sprung mass speed and the stroke speed. Simply put, skyhook control that follows Karnopp's law is a technique for dynamically controlling the damping coefficient of the variable damping force damper 14 in accordance with the directions (signs) of the stroke speed and the sprung mass speed. That is, when the signs of the sprung mass speed and the stroke speed match, the damping coefficient is controlled to be high, and when the signs do not match, the damping coefficient is controlled to be low.

Figure 4:
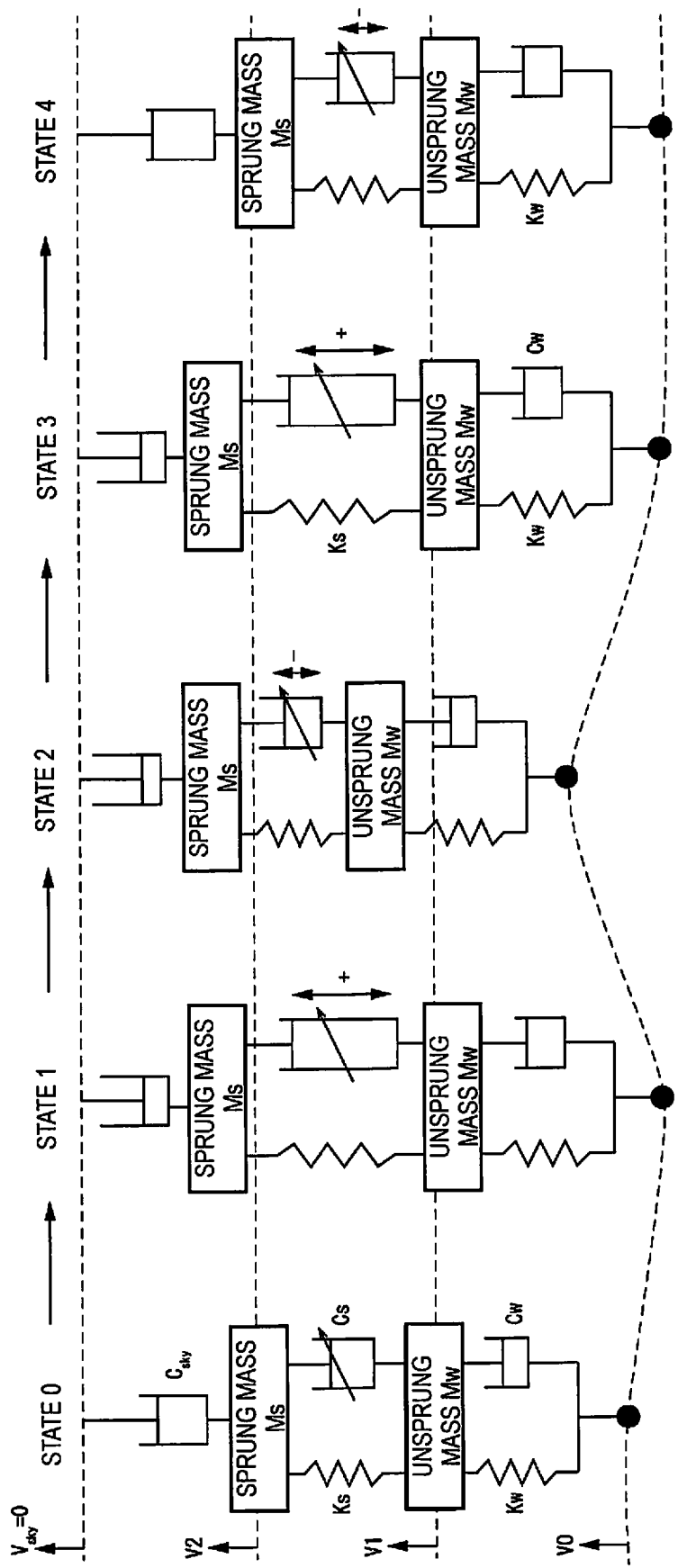
FIG. 4 is a diagram showing one example of a suspension control model for explaining the skyhook control theory following Karnopp's law.

The skyhook control theory that follows Karnopp's law will be described here using FIG. 4. That is, FIG. 4 is a diagram showing a suspension control model for explaining the skyhook control theory following Karnopp's law. In the suspension control model shown in the figure, the sprung mass Ms is connected to the unsprung mass Mw that contacts the road surface, via the suspension mechanism 10 in which the coil spring 12 and the variable damping force damper 14 are connected in parallel (state 0). In addition, in the drawing, when the unsprung mass speed is V1 and the sprung mass speed is V2 (however, the direction of upward movement with respect to the road surface is positive.), the virtual damping coefficient of the skyhook damper is Csky, and the variable damping coefficient of the variable damping force damper 14 is Cs, the variable damping coefficient Cs is expressed as $$C_s = C_{sky} \cdot V_2/(V_2 - V_1) \geq 0.$$

Therefore, in order to realize the skyhook control force with the damping coefficient of the variable damping force damper 14, the variable damping coefficient Cs must always be a positive value. That is, when $V_2/(V_2-V_1) \geq 0$;

$Cs = Csky \cdot V_2/(V_2 \cdot V_1)$ when $V_2/(V_2-V_1) < 0$;

$Cs = $ min (minimum value).

The Karnopp's law calculation unit 3221 calculates the damping coefficient for the skyhook control in accordance with the suspension control model described above. The calculated damping coefficient is output to the selection unit 3223 (refer to FIG. 3).

A case in which a vehicle travels on a gently undulating road surface will now be considered. First, if the unsprung mass Mw follows a gradual dip on the road surface, the coil spring 12 expands and the stroke speed V21 (V21=V2−V1) becomes a positive value, so that the control device 30 outputs a commands such that the variable damping coefficient Cs becomes a positive value (to increase the damping force) (State 1). Next, if the unsprung mass Mw follows a gradual rise on the road surface, the coil spring 12 compressed due to inertial force and the stroke speed V21 becomes a negative value, so that the control device 30 outputs a command such that the variable damping coefficient Cs becomes a minimum value min (to reduce the damping force) (State 2). Subsequently, when the unsprung mass Mw passes over the rise on the road surface, the coil spring 12 expands and the stroke speed V21 becomes a positive value, so that the control device 30 outputs a commands such that the variable damping coefficient Cs becomes a positive value (to increase the damping force) (State 3). Thereafter, when the unsprung mass Mw follows a flat road surface, the coil spring 12 shifts from expansion to compression and the stroke speed V21 becomes a negative value, so that, as a result, the control device 30 outputs a command such that the variable damping coefficient Cs becomes the minimum value min (State 4).

Figure 5:
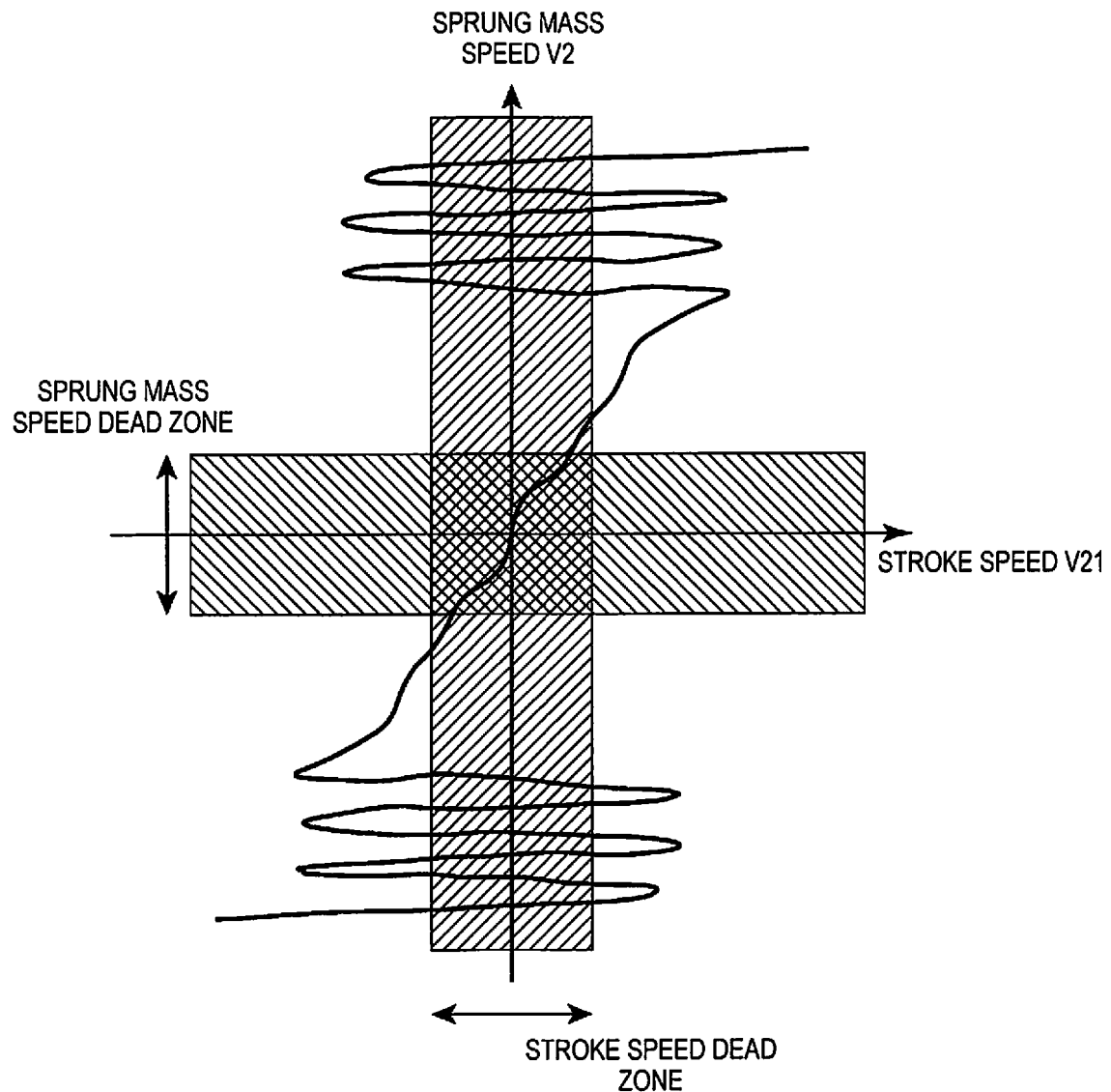
FIG. 5 is a diagram showing one example of a relationship between stroke speed and sprung mass speed according to the skyhook control theory following Karnopp's law.

In this manner, in the skyhook control theory that follows Karnopp's law, because the aim is to suppress sprung vibration, even if the sprung mass speed V2 is relatively high, for example, as shown in FIG. 5, if the sign of the stroke speed V21 is inverted, the variable damping coefficient Cs decreases, and it becomes difficult for the unsprung vibration to converge. Such unsprung mass resonance vibrations give the driver a "tramp sensation," which is wheel bounce vibration. In particular, the sign of the unsprung mass resonance vibration is inverted in the 10 Hz band, which deteriorates the damping effect. In addition, if it is difficult for the unsprung vibration to converge, inversion of the sign of the stroke speed V21 is likely to occur, and, as a result, the variable damping coefficient Cs is likely to repeatedly alternate between high-damping and low-damping. Such alternation between high-damping and low-damping imparts a "feeling of hardness" to the driver.

Thus, in the present embodiment, in order to reduce the unsprung "feeling of hardness" and the "tramp sensation" during conventional skyhook control, the control device 30 carries out a control to stop the application of Karnopp's law at a timing at which the positivity or negativity of the stroke speed V21 reverses, that is, in the region in which the stroke speed V21 crosses 0. In the present disclosure, a case in which Karnopp's law is not applied is referred to as the first condition and a case in which Karnopp's law is applied is referred to as the second condition.

That is, the damping force control mode determination unit 3222 decides between two damping force control modes, a first damping force control mode by means of non-application of Karnopp's law and a second damping force control mode by means of application of Karnopp's law, based on the relationship between the sprung mass speed V2 and the stroke speed V21. The second damping force control mode is, for example, a damping force control mode for achieving damping using a damping coefficient previously calculated by means of application of Karnopp's law. The damping force control mode determination unit 3222 outputs an instruction signal indicating the determined damping force control mode to the selection unit 3223.

Figure 6:
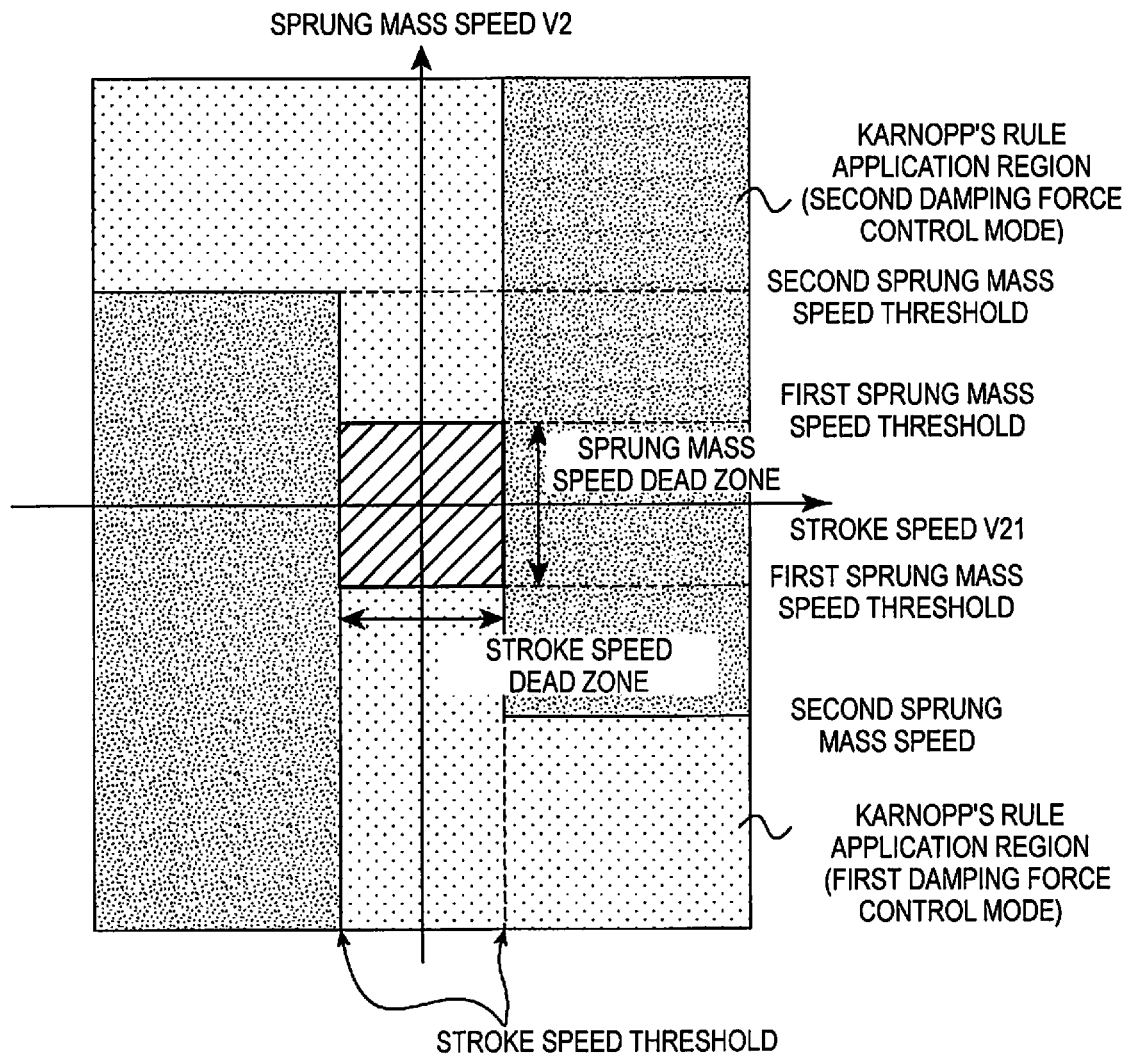
FIG. 6 is a diagram for explaining one example of a damping force control mode based on a relationship between stroke speed and sprung mass speed in the suspension control system according to one embodiment of the present invention.

FIG. 6 is a diagram for explaining one example of the damping force control mode based on the relationship between the stroke speed V21 and sprung mass speed V2 in the suspension control system according to one embodiment of the present invention. That is, the drawing shows, in the relationship between the sprung mass speed V2 and the stroke speed V21, in addition to a sprung mass speed V2 dead zone region and a stroke speed dead zone region, a Karnopp's law non-application region (first damping force control mode) in which Karnopp's law is not applied at a prescribed sprung mass speed V2, and a Karnopp's law application region (second damping force control mode) in which Karnopp's law is applied. As shown in the same figure, the damping force control mode determination unit 3222 makes a selection between the first damping force control mode and the second damping force control mode based on the sprung mass speed V2 and the stroke speed V21. That is, as one example, when the sprung mass speed V2 is greater than the dead zone and the signs of the sprung mass speed V2 and the stroke speed V21 are the same (first condition), Karnopp's law is not applied regardless of the sign of the stroke speed, and a prior damping coefficient that contributes to high-damping is used, for example. One example of a specific configuration of the damping force control mode determination unit 3222 will be described with reference to FIG. 7.

Returning to FIG. 3, the selection unit 3223 outputs a damping coefficient of the first damping force control mode or a damping coefficient of the second damping force control mode, in accordance with an instruction signal from the damping force control mode determination unit 3222. The damping coefficient output from the selection unit 3223 is output to the target control amount management unit 330 and output to the damping coefficient holding unit 3224.

The damping coefficient holding unit 3224 temporarily holds the damping coefficient output via the selection unit 3223. Usually, the damping coefficient held in the damping coefficient holding unit 3224 is updated as needed with a damping coefficient output from the selection unit 3223. The damping coefficient holding unit 3224 may be configured such that the damping coefficient is updated each time a prescribed period of time passes, for example. As a result, the damping coefficient holding unit 3224 can temporarily hold a damping coefficient previously calculated by the Karnopp's law calculation unit 3221.

Figure 7:
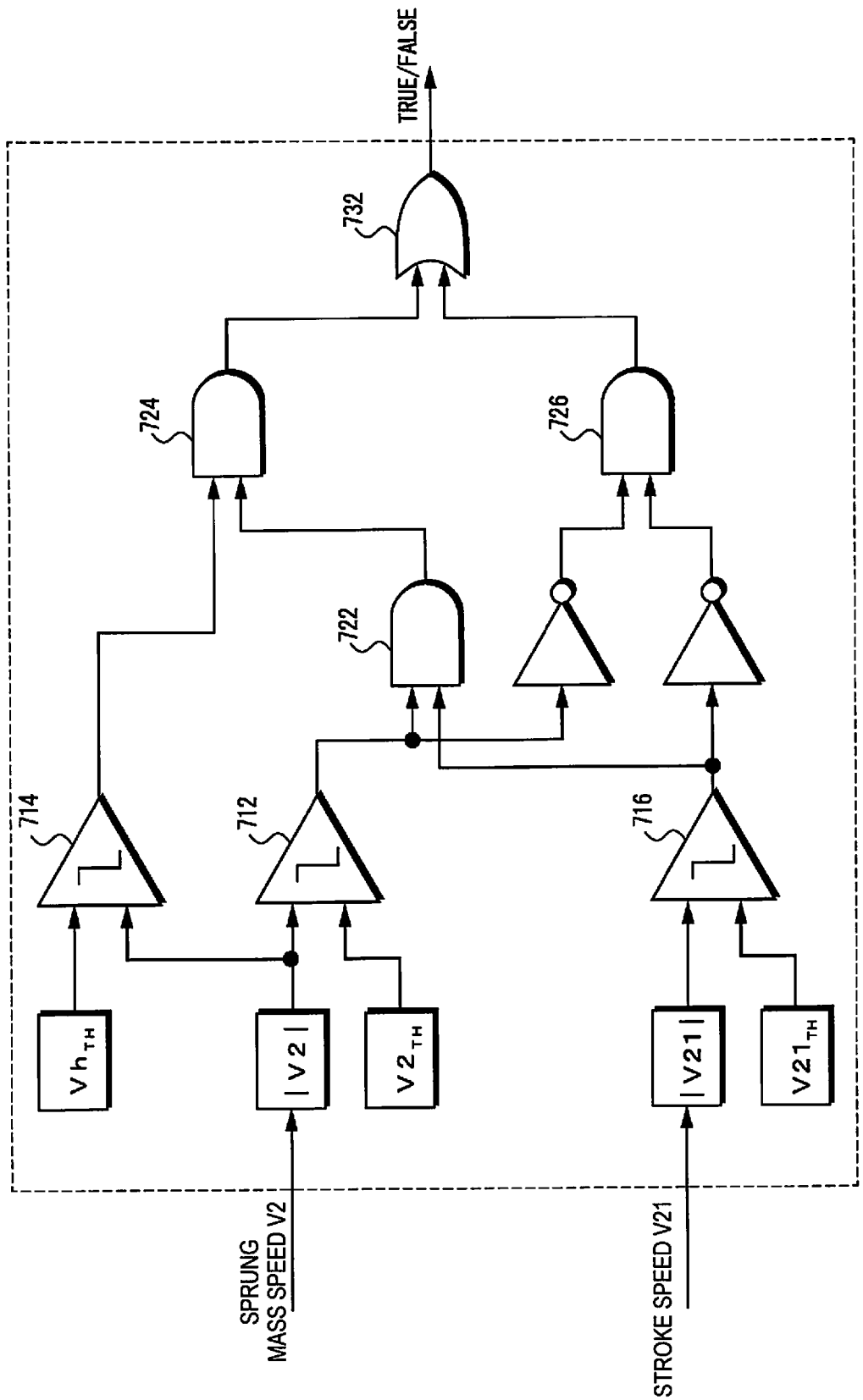
FIG. 7 is a block diagram showing one example of a configuration of a damping force control mode determination unit of the skyhook control unit shown in FIG. 3.

FIG. 7 is a block diagram showing one example of a configuration of the damping force control mode determination unit of the skyhook control unit shown in FIG. 3. As described above, the damping force control mode determination unit 3222 decides between two damping force control modes, a first damping force control mode by means of non-application of Karnopp's law and a second damping force control mode by means of application of Karnopp's law, based on the relationship between the sprung mass speed V2 and the stroke speed V21, as shown in FIG. 6. In other words, the damping force control mode determination unit 3222 according to the present embodiment outputs an instruction signal indicating the first damping force control mode for stopping the application of Karnopp's law when the stroke speed V21 is in the vicinity of 0 (in a region in which the sign of the stroke speed V21 is likely to be inverted).

More specifically, as shown in the figure, when receiving the sprung mass speed V2, the damping force control mode determination unit 3222 compares its absolute value with a first sprung mass speed threshold V$2_{TH}$ in a comparator 712, and compares its absolute value with a second sprung mass speed threshold Vh$_{TH}$ in a comparator 714. The first sprung mass speed threshold V$2_{TH}$ defines the sprung mass speed dead zone region, and the second sprung mass speed threshold V2Vh$_{TH}$ defines a Karnopp's law non-application region (first condition) based on the sprung mass speed V2. The comparison result of the comparator 712 is input to an AND gate 722, and its negative value is input to an AND gate 726. On the other hand, the comparison result of the comparator 714 is input to an AND gate 724.

In addition, when receiving the stroke speed V21, the damping force control mode determination unit 3222 compares the absolute value thereof with a stroke speed threshold V$21_{TH}$ in the comparator 712. The stroke speed threshold V$21_{TH}$ defines the stroke speed dead zone region. The comparison result of the comparator 712 is input to the AND gate 722, and its negative value is input to an AND gate 727.

The AND gate 722 carries out an AND operation based on the comparison result of the comparator 712 and the comparison result of the comparator 716. In addition, the AND gate 726 carries out an AND operation based on the negative value of the comparison result of the comparator 712 and the negative value of the comparison result of the comparator 716. That is, if the results of the operations of the AND gate 722 and the AND gate 726 are both "true," it means that there is the possibility that Karnopp's law will be applied beyond the corresponding dead zone region.

In addition, the AND gate 724 carries out an AND operation based on the comparison result of the comparator 714 and the operation result of the AND gate 722. That is, if the operation result of the AND gate 724 is "true," it means that Karnopp's law will be ultimately applied.

An OR gate 732 carries out an OR operation based on the operation result of the AND gate 724 and the operation result of the AND gate 726. That is, if the operation result of the AND gate 724 and/or the operation result of the AND gate 726 is "True" (second condition), Karnopp's law is applied. This is a case in which at least the absolute value of the sprung mass speed V2 exceeds the first sprung mass speed threshold V$2_{TH}$, and the absolute value of the stroke speed V21 exceeds a prescribed stroke speed threshold V$21_{TH}$; more specifically, this is a region that excludes the dead zone region and the Karnopp's law non-application region (for example, refer to FIG. 6).

In the present disclosure, as shown in FIG. 7, the damping force control mode determination unit 3222 is configured as a type of logic circuit, but no limitation is imposed thereby, and may be configured by in software.

Figure 8:
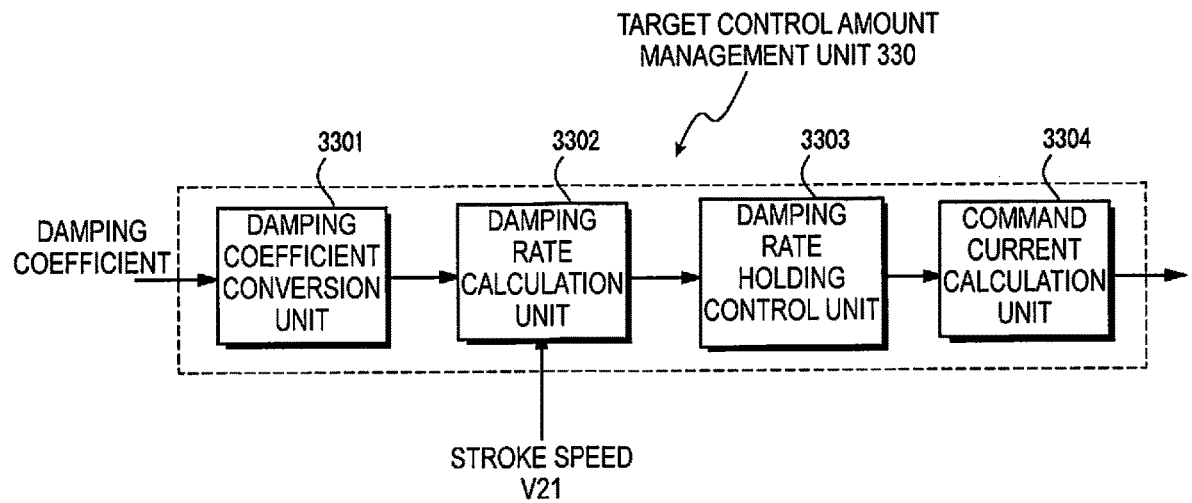
FIG. 8 is a block diagram showing one example of a configuration of a target control amount management unit of the control device in the suspension control system according to one embodiment of the present invention.

FIG. 8 is a block diagram showing one example of the configuration of a target control amount management unit of the control device in the suspension control system according to one embodiment of the present invention. As shown in the figure, the target control amount management unit 330 according to the present embodiment can be composed of, for example, a damping coefficient conversion unit 3301, a damping rate calculation unit 3302, a damping rate holding control unit 3303, and a command current calculation unit 3304. In the present disclosure, the damping rate holding control unit 3303 may be referred to as the damping coefficient holding control unit.

Prior to determining the damping rate, the damping coefficient conversion unit 3301 uses a prescribed coefficient to convert the damping coefficient output from the skyhook control unit 322 to a prescribed damping force. The damping coefficient conversion unit 3301 outputs the damping coefficient subjected to coefficient conversion to the damping rate calculation unit 3302.

The damping rate calculation unit 3302 calculates the prescribed damping rate (damping coefficient saturation) based on the stroke speed V21 and the damping coefficient subjected to coefficient conversion output from the damping coefficient conversion unit 3301. The damping rate is indicated by a numerical value from 0 to 100%, for example. For example, the damping rate calculation unit 3302 calculates the damping rate from the relationship between the stroke speed V21 and the damping coefficient subjected to coefficient conversion, in accordance with a damping rate conversion map shown in FIG. 9. In the damping rate conversion map, damping rates in which the "feeling of hardness" is from 0% (SOFT) to 100% (FIRM) are defined, for example. The damping rate conversion map is stored, for example, in an unshown memory of the control device 30. In another embodiment, the damping rate calculation unit 3302 is obtained using a preset virtual stroke speed. The damping rate calculation unit 3302 outputs the calculated damping rate to the damping rate holding control unit 3303.

The damping rate holding control unit 3303 enables a damping force control corresponding to the envelope amplitude of the damping rate, based on the calculated damping rate. That is, in a damping force increasing phase, the damping rate holding control unit 3303 samples and detects the peak value of the amplitude of the damping rate that changes with time, holds said peak value, and outputs it as the target control force (target damping rate), in order to maintain the responsiveness of the increase in damping force. In this case, the damping rate holding control unit 3303 adjusts the damping force increase speed in accordance with a prescribed increase rate limit value. The prescribed increase rate limit value is provided as a prescribed increase rate per unit time, for example. In addition, when it is determined that a newly detected peak value is smaller than a previously detected peak value (for example, immediately before), the damping rate holding control unit 3303 adjusts a damping force decrease speed in accordance with a prescribed decrease rate limit value, in order to prevent tramping of the unsprung mass caused by a sudden decrease in the damping coefficient (damping rate). The prescribed decrease rate limit value is provided as a prescribed increase rate per unit time, for example, and is set such that the damping rate changes from 100% (FIRM) to 0% (SOFT) over an unsprung resonance period T [s] or longer.

Moreover, when it is determined that a new peak value could not be detected for a prescribed period of time after the peak value detected immediately before, the damping rate holding control unit 3303 executes a control such that the damping rate decreases in accordance with a prescribed decrease rate limit value, after a prescribed peak hold time has elapsed, in order to sufficiently maintain the time for applying the damping force with respect to the sprung mass. A new peak value is a peak value that exceeds the peak value detected immediately before. The prescribed peak hold time is set to be greater than or equal to the sprung mass resonance period, for example. In the present embodiment, the commencement of the prescribed peak hold time matches the commencement of the undetected time.

In the present disclosure, an example was presented in which the damping rate holding control unit 3303 determines the target control force based on the damping rate converted based on the damping coefficient by the damping rate calculation unit 3302, but a configuration in which the damping rate holding control unit 3303 directly determines the target control force based on a damping coefficient without using the damping rate may be employed.

Figure 10:
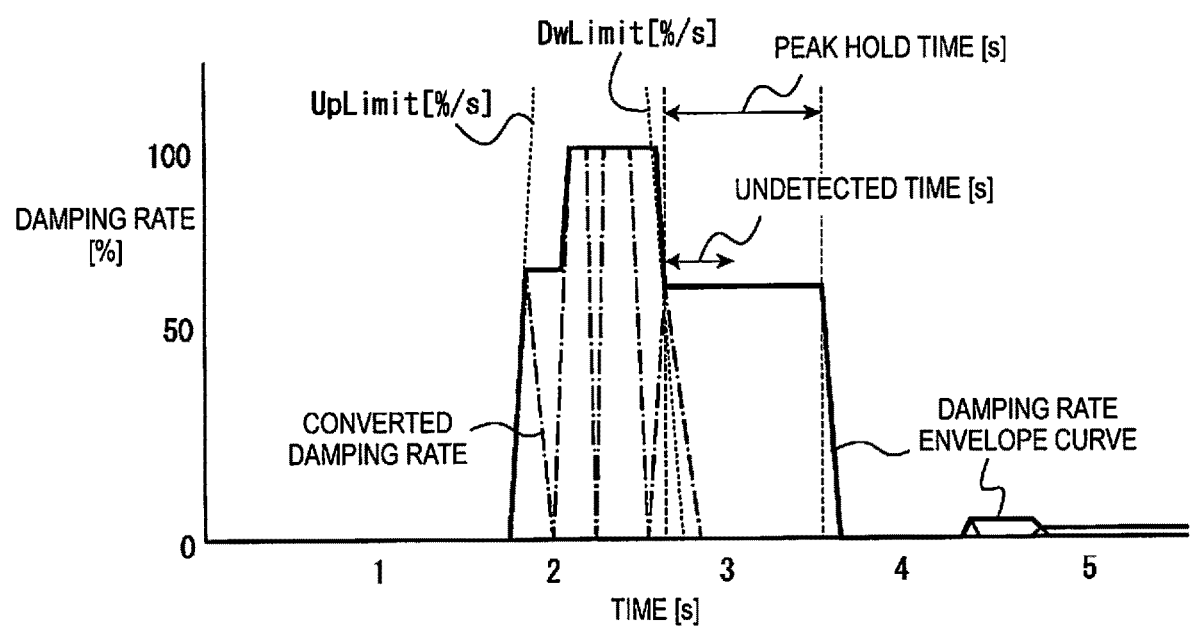
FIG. 10 is a graph showing one example of a damping rate envelope curve obtained by a damping rate holding control unit in the suspension control system according to one embodiment of the present invention.

FIG. 10 is a graph showing one example of a damping rate envelope curve obtained by the damping rate holding control unit in the suspension control system according to one embodiment of the present invention. In the figure, the dashed-dotted line represents the damping rate. Typically, the amplitude of the damping rate changes frequently. In addition, the thick solid line represents the damping rate envelope curve based on the peak value of the damping rate. As shown in the figure, for example, the damping rate envelope curve follows a prescribed increase rate limit value UpLimit during the damping force increasing phase, and follows a prescribed decrease rate limit value DwLimit during the damping force decreasing phase. In addition, if a new peak value is not detected for a prescribed period of time after the peak value detected immediately before, the damping rate envelope curve decreases, to zero in this example, in accordance with the prescribed decrease rate limit value, after the prescribed peak hold time has elapsed.

As described above, the damping rate holding control unit 3303 outputs the held value to the command current calculation unit 3304, such that the damping rate does not suddenly fluctuate.

Returning to FIG. 8, the command current calculation unit 3304 calculates and outputs a prescribed command current based on the value of the damping rate output from the damping rate holding control unit 3303.

Figure 11:
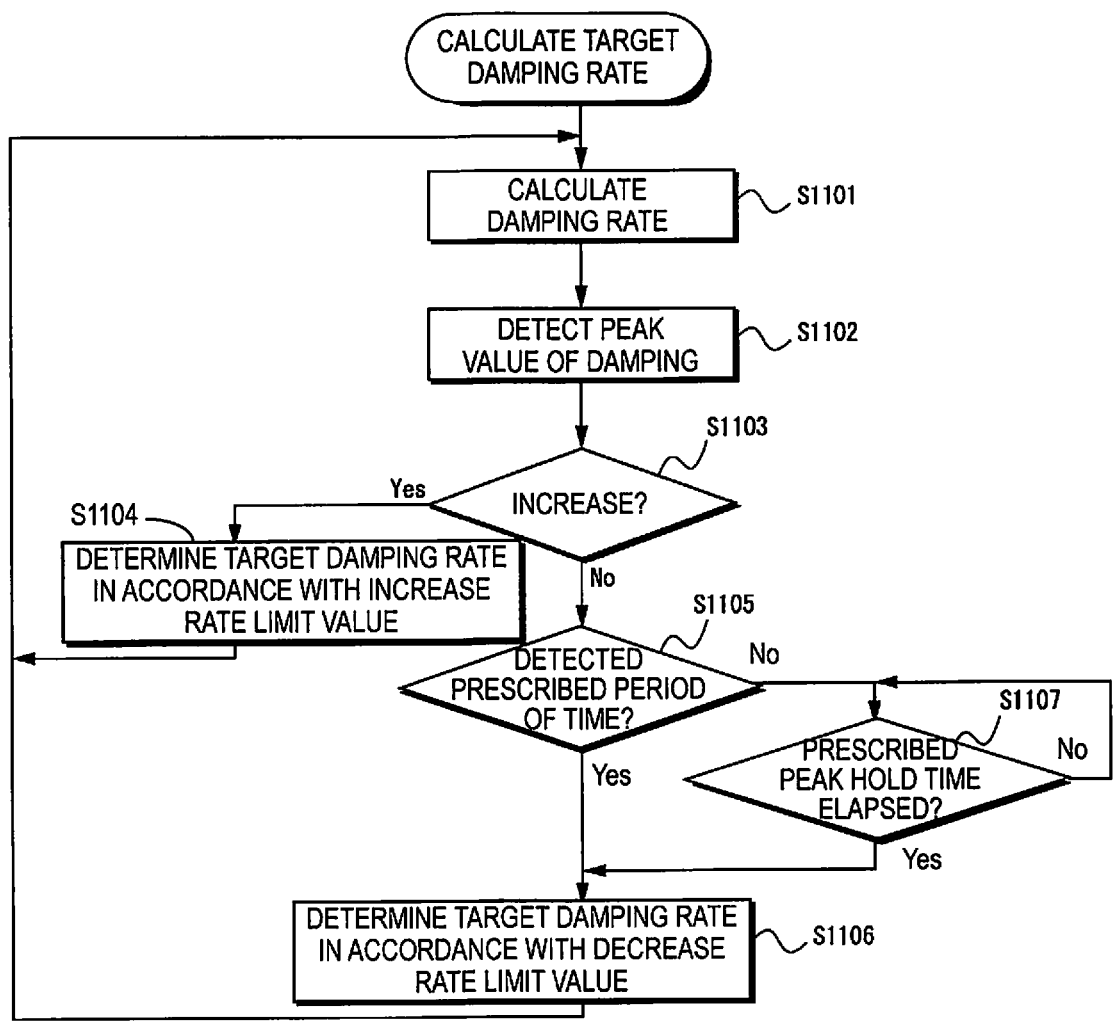
FIG. 11 is a flowchart for describing one example of the processing of a target control amount management unit of the control device in the suspension control system according to one embodiment of the present invention.

FIG. 11 is a flowchart for describing one example of a processing of the target control amount management unit 330 of the control device in the suspension control system according to one embodiment of the present invention. Such processing is realized, for example, by the execution of prescribed control program by a processor of the control device 30.

Figure 9:
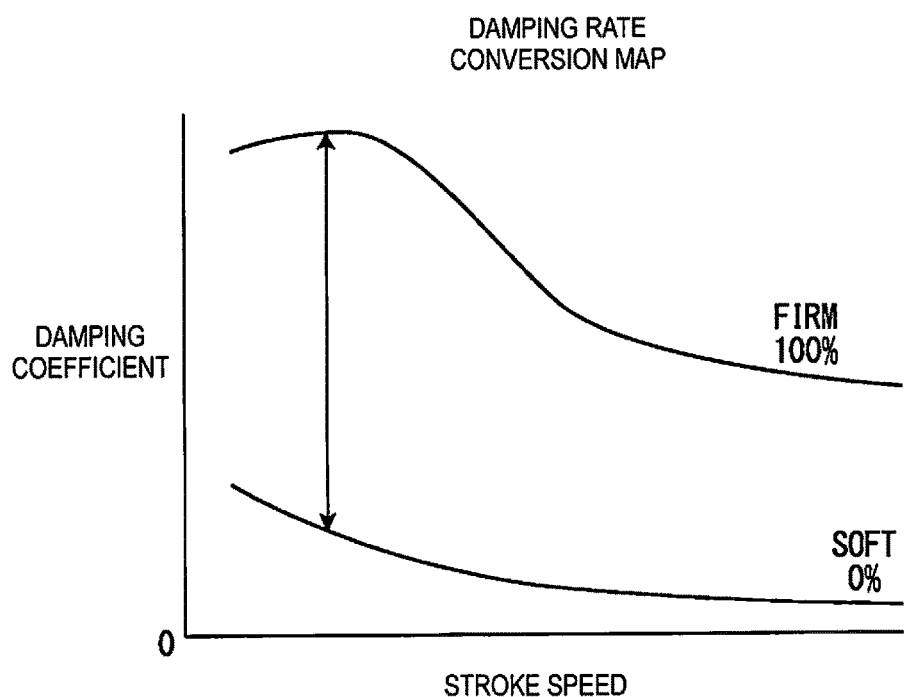
FIG. 9 is a diagram showing one example of a damping rate conversion map in the suspension control system according to one embodiment of the present invention.

As shown in the figure, first, the target control amount management unit 330 calculates the damping rate from the relationship between the stroke speed and the damping coefficient subjected to coefficient conversion, in accordance with a damping rate conversion map such as that shown in FIG. 9, based on a damping coefficient given a prescribed gain (S1101). Subsequently, the target control amount management unit 330 detects the peak value of the damping rate (S1102), and determines whether the damping force is in an increasing phase or a decreasing phase (S1103).

If the damping force is determined to be in an increasing phase (Yes in S1103) based on the detected peak value of the damping rate, the target control amount management unit 330 determines a target damping rate in accordance with the envelope amplitude of the damping rate, in accordance with the prescribed increase rate limit value (S1104). If the target damping rate exceeds 100%, the target control amount management unit 330 sets the target damping rate to 100%. The target control amount management unit 330 then returns to the process of S1101 to calculate the next damping rate.

In contrast, if the damping force is determined not to be in an increasing phase (No in S1103), the target control amount management unit 330 determines whether a peak value of the damping rate has been detected within a prescribed period of time (S1105). If it is determined that a peak value of the damping rate has been detected within a prescribed period of time (Yes in S1105), the target control amount management unit 330 determines a target damping rate in accordance with the envelope amplitude of the damping rate, in accordance with the prescribed decrease rate limit value (S1106). The target damping rate is output to the command current calculation unit 3304. In this manner, since the target damping rate is determined based on the prescribed decrease rate limit value, tramping of the unsprung mass caused by a sudden decrease in the damping coefficient is prevented. If the target damping rate is less than 0%, the target control amount management unit 330 sets the target damping rate to 0%.

On the other hand, if it is determined that a peak value of the damping rate has not been detected within a prescribed period of time (No in S1105), the target control amount management unit 330 further determines whether a prescribed peak hold time has elapsed (S1107). As described above, the prescribed peak hold time is for sufficiently maintaining the time for applying the damping force with respect to the sprung mass. The target control amount management unit 330 continues monitoring until the prescribed peak hold time has elapsed (No in S1107), and when it is determined that the prescribed peak hold time has elapsed (Yes in S1107), the target control amount management unit determines a target damping rate in accordance with the envelope amplitude of the damping rate, in accordance with the prescribed decrease rate limit value (S1106). The target damping rate is output to the command current calculation unit 3304. As a result, sufficient time for applying the damping force with respect to the sprung mass can be secured.

When the target damping rate is determined during the damping force decreasing phase, the target control amount management unit 330 returns to the process of S1101 to calculate the next damping rate.

Figure 12:
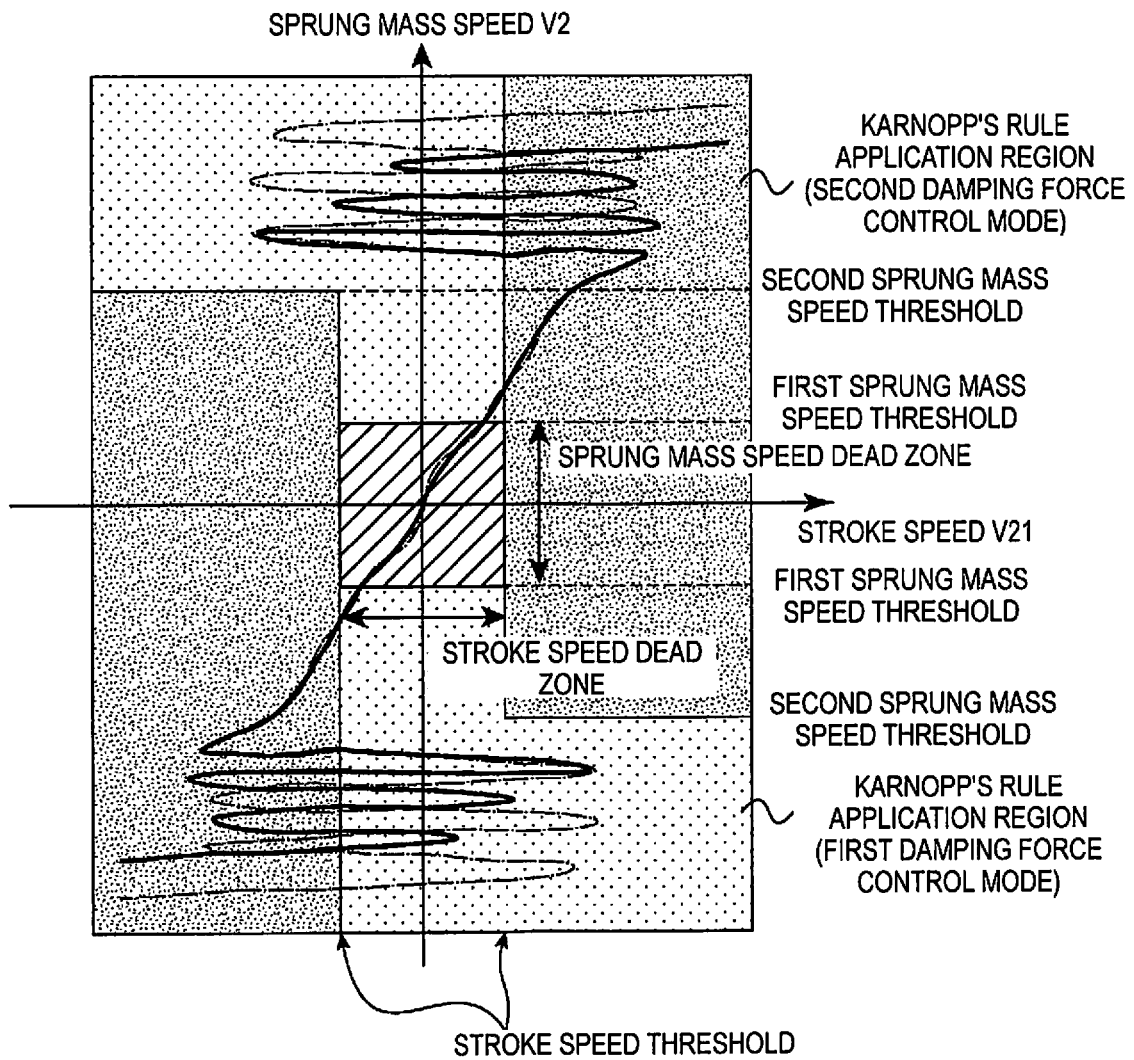
FIG. 12 is a diagram for explaining one example of the relationship between stroke speed and sprung mass speed by means of the skyhook control in the suspension control system according to one embodiment of the present invention.

FIG. 12 is a diagram for explaining one example of the relationship between stroke speed and sprung mass speed by means of the skyhook control in the suspension control system according to one embodiment of the present invention. Shown is a graph in which the relationship between sprung mass speed and stroke speed, which changes by means of the skyhook control of the present embodiment, is superimposed on FIG. 6. In the figure, the solid line indicates the skyhook control of the present embodiment. In addition, the dashed-dotted line shows one example of the skyhook control according to Karnopp's law shown in FIG. 5.

As shown in the figure, according to the skyhook control of the present embodiment, when the stroke speed is in a region near 0 (that is, a region that straddles the axis of stroke speed V21=0), a prior damping coefficient that has been held is used instead of the damping coefficient according to Karnopp's law. As a result, the "tramp sensation" below the springs caused by the conventional skyhook control, and the "feeling of hardness" caused by the unsprung vibration not converging, can be effectively reduced.

As described above, by means of the present embodiment, it is possible to carry out attitude control by applying the damping force (control force) to the unsprung mass, without depending on the current stroke speed.

In addition, according to the present embodiment, since skyhook control by means of an application of Karnopp's law and skyhook control by means of a non-application of Karnopp's law are switched based on the relationship between the current sprung mass speed and the current stroke speed, the unsprung "feeling of hardness" and the "tramp sensation," which are problems of the conventional skyhook control, can be effectively reduced. In particular, according to the present embodiment, since skyhook control by means of application of Karnopp's law is not carried out when the stroke speed is in a region near 0, the unsprung "tramp sensation" and the "feeling of hardness" caused by the non-convergence of unsprung vibrations, which are problems of conventional skyhook control, can be effectively reduced. Further, according to the present embodiment, if the sprung mass speed exceeds the prescribed sprung mass speed threshold, skyhook control is carried out based on a prior, temporarily held damping coefficient without using Karnopp's law, so that the unsprung "feeling of hardness" and the "tramp sensation" are effectively reduced.

In addition, according to the present embodiment, since the target damping rate is adjusted/controlled in accordance with an envelope curve in accordance with the peak value of the envelope amplitude of the prescribed damping rate based on the damping coefficient, it becomes possible to effectively suppress vibrations caused by alternations between high-damping and low-damping. Further, according to the present embodiment, since the calculated damping coefficient is converted into a prescribed damping rate based on the physical quantities and states estimated based on various sensors, it is possible to improve the driver's ride comfort.

In addition, according to the present embodiment, during the damping force increasing phase, the damping rate is changed in accordance with the prescribed increase rate limit value; therefore, it is possible to maintain the responsiveness of the damping force increase while suppressing the unsprung tramp sensation caused by a sudden increase in the damping force. Further, according to the present embodiment, during the damping force decreasing phase, the suspension control system 1 changes the damping rate in accordance with the prescribed decrease rate limit value; therefore, it is possible to maintain the responsiveness of the damping force decrease while preventing an unsprung tramp sensation caused by a sudden decrease in the damping force.

Furthermore, according to the present embodiment, when it is determined that a new peak value of the damping coefficient (damping rate) could not be detected for a prescribed period of time after the peak value detected immediately before, after a prescribed peak hold time has elapsed a control is executed such that the damping rate decreases in accordance with a prescribed decrease rate limit value, so that it becomes possible to sufficiently maintain the time for application of the damping force with respect to the sprung mass, by means of a low damping force after the prescribed peak hold time, while effectively suppressing the resonance vibration of the unsprung mass.

In addition, according to the present embodiment, since the sprung mass speed and/or the stroke speed is calculated based on signals output from various sensors, it is possible to employ a flexible configuration of the various sensors.

In the present embodiment, when Karnopp's law is not applied in the skyhook control, a prior damping coefficient that has been held is used, but the invention is not limited thereto; for example, a fixed value may be used. As another example, a limit value may be set for changes in the damping coefficient, and the damping coefficient may be determined to be within the limit value from the previous damping coefficient.

Second Embodiment

In the present embodiment, a suspension control system is disclosed which realizes damping force control that does not depend on the stroke speed, in the skyhook control of a suspension mechanism.

Figure 13:
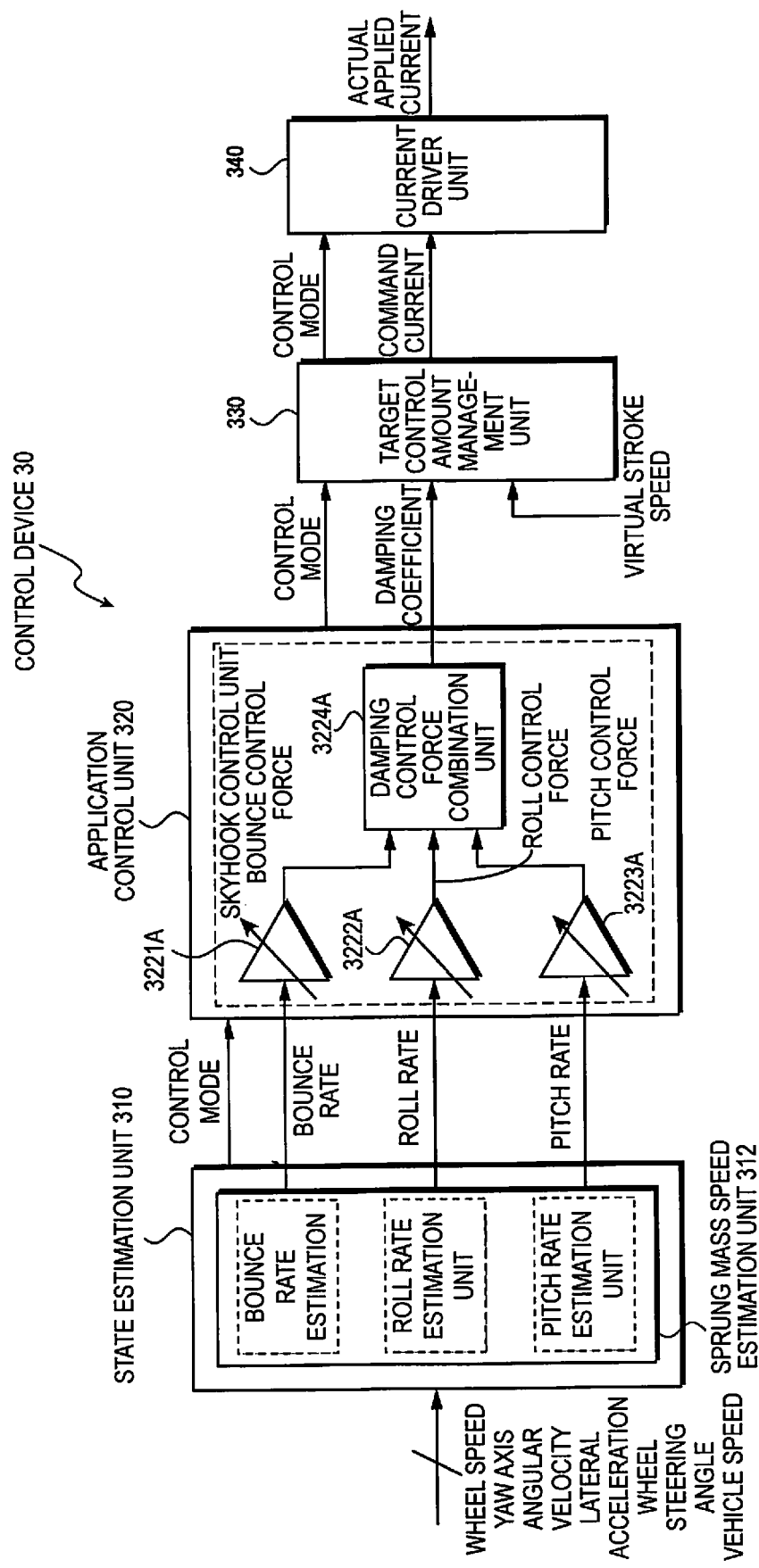
FIG. 13 is a block diagram explaining one example of a configuration of a control device in the suspension control system according to one embodiment of the present invention.

FIG. 13 is a block diagram explaining one example of a configuration of a control device in the suspension control system according to one embodiment of the present invention. As shown in the figure, in the control device 30 according to the present embodiment, the function/configuration of the state estimation unit 310 and the function/configuration of the skyhook control unit 322 of the application control unit 320 are different from those of the embodiment described above. Descriptions of constituent elements that are the same as those of the embodiment described above have been appropriately omitted.

As shown in the figure, the state estimation unit 310 can be composed of a sprung mass speed estimation unit 312 that estimates the sprung mass speeds (bounce rate, roll rate, and pitch rate) for the skyhook control based on the output values of various sensors 20. In the present embodiment, since a sprung vertical acceleration sensor is not provided, the sprung mass speed can be estimated using a prescribed estimation model.

That is, the sprung mass speed estimation unit 312 uses the prescribed estimation model described above to calculate the bounce rate, roll rate, and the pitch rate for the skyhook control. The sprung mass speed estimation unit 312 outputs the calculated bounce rate, roll rate, and pitch rate to the skyhook control unit 322 of the application control unit 320.

The skyhook control unit 322 of the present embodiment calculates the damping coefficient based on the bounce rate, roll rate, and pitch rate. For example, the skyhook control unit 322 can be composed of a bounce rate gain unit 3221A, a roll rate gain unit 3222A, a pitch rate gain unit 3223A, and a damping control force combination unit 3224A.

The bounce gain unit 3221A gives a prescribed gain to the bounce rate output from the sprung mass speed estimation unit 312 and outputs the result to the damping control force combination unit 3224A as the bounce control force. Further, the roll gain unit 3222A gives a prescribed gain to the roll rate output from the sprung mass speed estimation unit 312 and outputs the result to the damping control force combination unit 3224A as the roll control force. Further, the pitch rate gain unit 3223A gives a prescribed gain to the pitch rate output from the sprung mass speed estimation unit 312 and outputs the result to the damping control force combination unit 3224A as the pitch control force.

The damping control force combination unit 3224A calculates the respective absolute values of the bounce control force, the roll control force, and the pitch control force, and combines (adds) these absolute values to calculate the damping coefficient. The damping control force combination unit 3224A outputs the calculated damping coefficient to the target control amount management unit 330.

As described above, the target control amount management unit 330 considers a prescribed control mode, a human sense of vehicle speed, sense of vibration with respect to each direction of movement of bounce/roll/pitch, and the like, corrects and/or adjusts the target control force with respect to the suspension mechanism 10, and calculates the final target control force. The target control amount management unit 330 according to the present embodiment is basically the same as the functional configuration shown in FIG. 8, but is different from the embodiment described above in that a virtual stroke speed is used instead of a stroke speed estimated based on the stroke speed output from the stroke sensor 21 and values output from the various sensors 20, in order to calculate the damping rate. In the present embodiment, the virtual stroke speed is set to a value of about 0.1 m/s, for example, in consideration of the sprung mass resonance phenomenon, but no limitation is imposed thereby, and any appropriate value can be used.

In particular, in the target control amount management unit 330, the damping rate holding control unit 3303 holds the damping rate that becomes the peak value, while adjusting/controlling the target damping rate in accordance with the damping rate envelope curve, as described above. As a result, vibrations caused by alternations between high-damping and low-damping are effectively suppressed.

Figure 14:
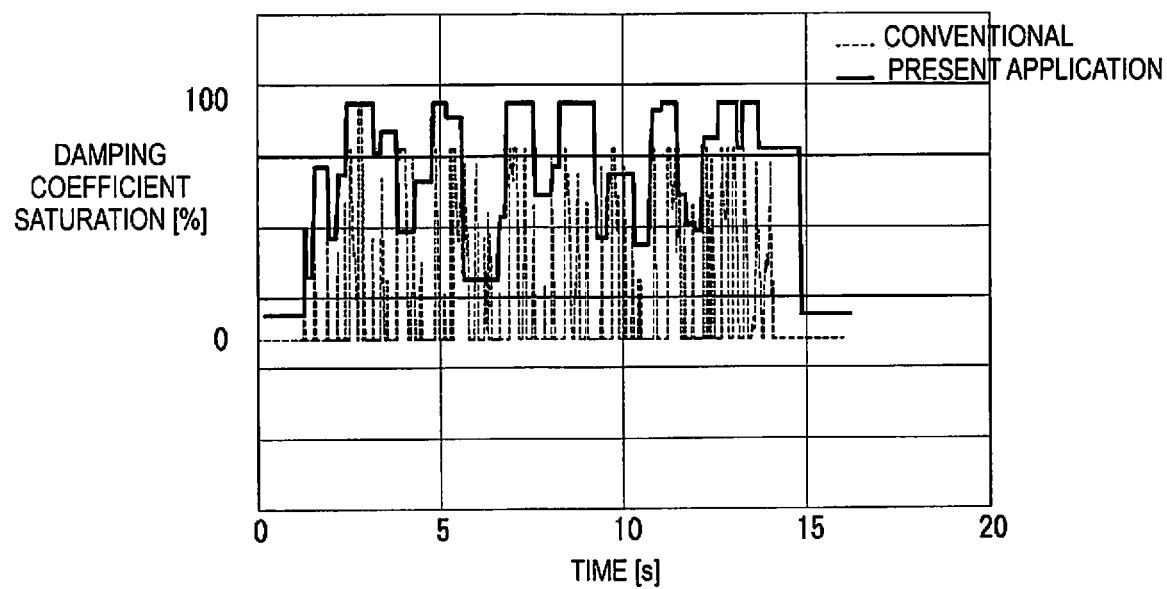
FIG. 14 is a graph showing an amplitude envelope of a target damping rate in the suspension control system according to one embodiment of the present invention.

As described above, according to the present embodiment, it is possible to obtain the same or equivalent effects or advantages as those of the first embodiment. That is, according to the present embodiment, the damping coefficient is calculated based on the bounce control force, the roll control force, and the pitch control force without using a damping coefficient according to Karnopp's law, which depends on the stroke speed, and, further, the calculated damping coefficient is used to enable control of the damping force corresponding to the envelope amplitude of the damping rate, so that it is possible to apply the damping force to the unsprung mass. FIG. 14 is a graph showing the amplitude envelope of the target damping rate. By means of a skyhook control corresponding to the envelope amplitudes of the damping rate as shown in the figure, the sprung mass damping index was reduced by about ⅓ without deteriorating control in the 3-6 Hz band, compared to conventional skyhook control by means of application of Karnopp's law. As a result, the "tramp sensation" and "feeling of hardness" that occur as a result of ignoring the unsprung vibration in conventional skyhook control are effectively reduced, the damping force on the sprung mass and the unsprung mass is effectively maintained, changes (vibrations) in the damping force are suppressed, and the unsprung resonance amplitude can be reduced.

Third Embodiment

In the present embodiment, regarding various sensors used for the skyhook control, a suspension control system using various acceleration sensors instead of, or in addition to, the stroke sensor, is disclosed.

Figure 15:
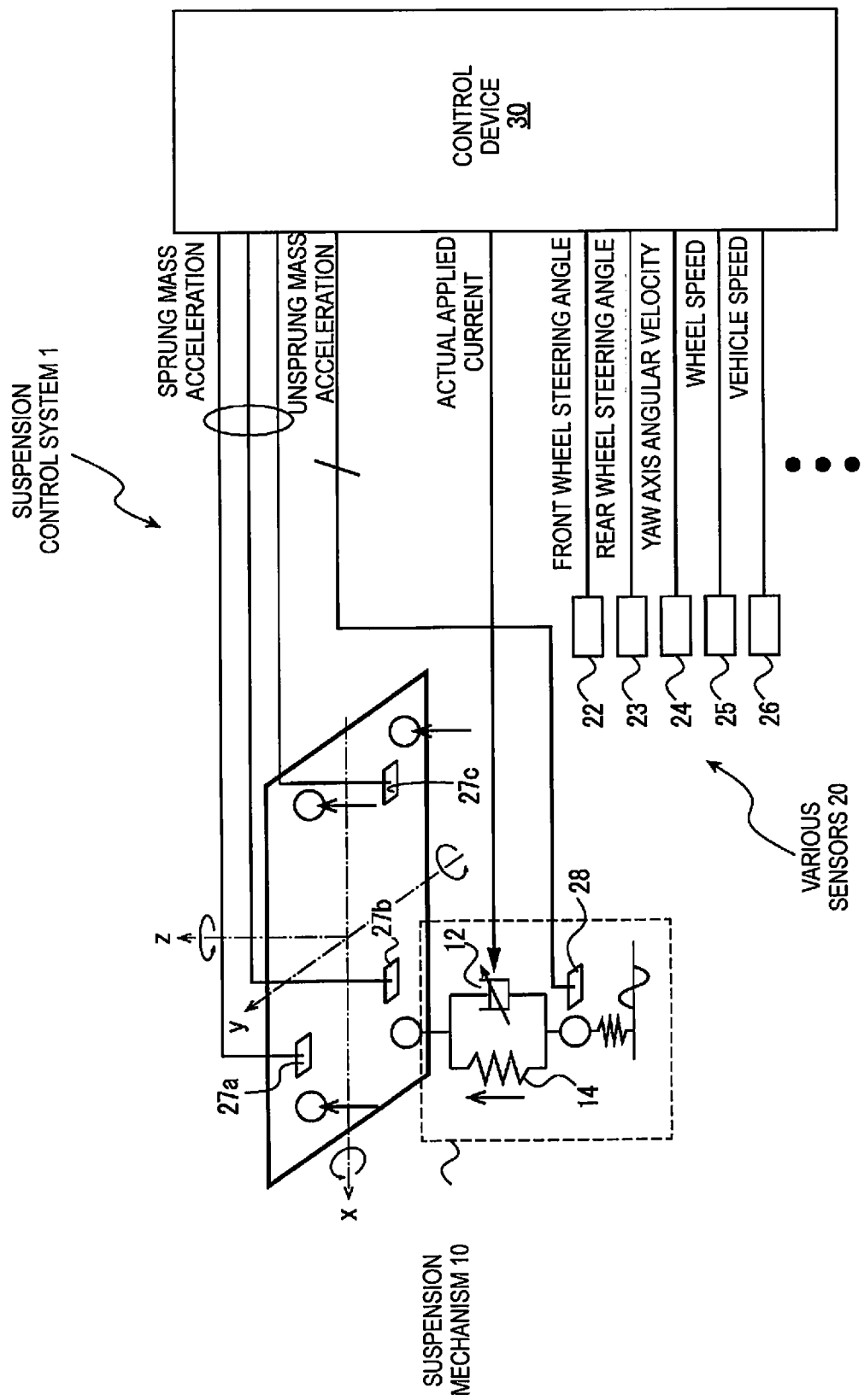
FIG. 15 is a block diagram explaining one example of a configuration of a suspension control system according to one embodiment of the present invention.

FIG. 15 is a block diagram explaining one example of a configuration of a suspension control system according to one embodiment of the present invention. The suspension control system 1 shown in the figure is different from that shown in FIG. 1 in that various acceleration sensors for the skyhook control are provided. Descriptions of constituent elements that are the same as those of the embodiment described above have been appropriately omitted.

That is, as shown in the figure, the suspension control system 1 according to the present embodiment can be composed of various sensors 20 related to the travel of the vehicle. In the figure, in addition to the above-described wheel speed sensor 22, front wheel steering angle sensor 23, rear wheel steering angle sensor 24, yaw axis angular velocity sensor 25, and vehicle speed sensor 26, for example, a plurality of sprung mass acceleration sensors 27 and a plurality of unsprung mass acceleration sensors 28 are provided as the various sensors 20.

The sprung mass acceleration sensor 27 can be provided at any location on the vehicle body, for example. In the present example, three sprung mass acceleration sensors 27a, 27b, 27c are provided apart from each other, but the invention is not limited thereto. Each of the sprung mass acceleration sensors 27 detects the acceleration of the sprung mass in the bounce direction (Z-axis direction). In addition, the sprung mass acceleration sensor 27 can detect the acceleration of the sprung mass in the horizontal direction (Y-axis direction). Each of the sprung mass acceleration sensors 27 outputs a signal corresponding to the detected acceleration to the control device 30.

The unsprung mass acceleration sensor 28 is provided at a position below an elastic body (for example, a coil spring) of each suspension mechanism 10 of the four wheels, for example. In the figure, only the unsprung mass acceleration sensor 28a of the representative suspension mechanism 10 is shown. Each of the unsprung mass acceleration sensors 28 detects the acceleration of the unsprung mass in the bounce direction (Z-axis direction), and outputs a signal corresponding to the detected acceleration to the control device 30.

The state estimation unit 310 of the control device 30 estimates the stroke speed V21 in the suspension mechanism 10 and the bounce rate, roll rate, and pitch rate of the sprung mass based on various accelerations detected by the acceleration sensors 27 and 28.

For example, the state estimation unit 310 calculates a relative acceleration based on the sprung mass acceleration output from the sprung mass acceleration sensor 27 and the unsprung mass acceleration output from the corresponding unsprung mass acceleration sensor 28, and estimates the stroke speed based on the calculated relative acceleration. The state estimation unit 310 pseudo-integrates the accelerations output from the acceleration sensors 27 and 28 by means of a digital filter, estimates the physical quantity in the velocity dimension, estimates the state of the sprung mass and/or the unsprung mass based on the wheel speed output from the wheel speed sensor 22, and can estimate the physical quantity in the velocity dimension.

In this manner, together with the sprung mass speed, the stroke speed estimated by the state estimation unit 310 is output to the skyhook control unit 322 of the application control unit 320, as described in the first embodiment. The skyhook control unit 322 determines the damping coefficient for enabling the skyhook control based on the sprung mass speed and the stroke speed calculated by the state estimation unit 310.

As described above, according to the present embodiment, it is possible to obtain the same or equivalent effects or advantages as those of the embodiments described above. That is, according to the present embodiment, when the stroke speed V21 is in a region near 0 (that is, a region that straddles the axis of stroke speed V21=0), a retained immediately prior damping coefficient is used instead of the damping coefficient (damping rate) according to Karnopp's law. As a result, the "tramp sensation" and "feeling of hardness" caused by the conventional skyhook control are effectively reduced. It is also possible to apply the configuration of the stroke control system according to the second embodiment to the configuration of the stroke control system according to the present embodiment, in which case the same effects or advantages can be obtained.

The embodiments described above are examples for explaining the present invention and are not intended to limit the present invention to these embodiments. The present invention can be implemented in various forms without departing from the essence thereof.

For example, in the method disclosed in the present Specification, as long as the results are not inconsistent, the steps, actions, or functions may be carried out in parallel or in a different order. The steps, actions, and functions that have been described are provided merely as examples; some of the steps, actions, and functions may be omitted without departing from the essence of the invention, may be combined into one, or other steps, actions, or functions may be added.

In addition, as described above, the suspension control system 1 may calculate the sprung mass speed based on values output from the various sensors 20, or by using the stroke speed. In this case, the suspension control system 1 may directly calculate the stroke speed based on a value output from the stroke sensor 21, or based on values output from various sensors besides the stroke sensor 21. In addition, the suspension control system 1 may carry out the skyhook control using the sprung mass speed without depending on the stroke speed, or carry out the skyhook control using the stroke speed (for example, in a region in which the stroke speed straddles 0).

More specifically, the present invention can be applied to the following systems.

(1) A system that detects the sprung mass speed and the stroke speed by means of an acceleration sensor and a stroke sensor;

(2) a system that calculates the sprung mass speed by means of an acceleration sensor and estimates or infers the stroke speed based on values (sense data) from various sensors;

(3) a system that detects the stroke speed by means of a stroke sensor and infers the sprung mass speed based on values from various sensors; or (4) a system that infers both the sprung mass speed and the stroke speed based on values from various sensors besides the acceleration sensor and the stroke sensor.

The estimation of the sprung mass speed and/or the stroke speed can be carried out using conventional methods.

In addition, various embodiments are disclosed in the present Specification, but a specific feature (technical matter) of one embodiment may be appropriately improved and added to another embodiment, or be replaced with a specific feature in said other embodiment, and such an embodiment is also included in the body of the present invention.

The invention claimed is:

1. A suspension control method for controlling a suspension control system that includes a suspension mechanism provided between a sprung mass and an unsprung mass and including an elastic body and a variable damping force damper, the suspension control method comprising:
calculating a sprung mass speed of the sprung mass based on a value detected by at least one sensor from among a plurality of sensors;
calculating a current damping coefficient of the variable damping force damper based on the sprung mass speed;
selecting a prior damping coefficient as a selected damping coefficient upon determining that a first condition is satisfied and selecting the current damping coefficient as the selected damping coefficient upon determining that the first condition is not satisfied;
determining a target control force based on the selected damping coefficient;
applying the target control force to the variable damping force damper; and
temporarily holding the current damping coefficient as the prior damping coefficient to be used in a subsequent control cycle.

2. The suspension control method according to claim 1, further comprising
calculating a stroke speed in the suspension mechanism based on a value detected by at least one sensor from among the plurality of sensors.

3. The suspension control method according to claim 2, wherein
under a second condition, the calculating of the current damping coefficient is carried out by applying the sprung mass speed and the stroke speed to Karnopp's law.

4. The suspension control method according to claim 3, wherein
the second condition is a case in which an absolute value of the current sprung mass speed exceeds a first sprung mass speed threshold and an absolute value of the current stroke speed exceeds a stroke speed threshold.

5. The suspension control method according to claim 2, wherein
the first condition is a case in which an absolute value of the sprung mass speed exceeds a second sprung mass speed threshold, and an absolute value of the stroke speed exceeds a stroke speed threshold.

6. The suspension control method according to claim 2, wherein
the first condition is a case in which the stroke speed crosses 0.

7. The suspension control method according to claim 2, wherein
the stroke speed is calculated based on values detected by a sprung mass acceleration sensor and an unsprung mass acceleration sensor from among the plurality of sensors.

8. The suspension control method according to claim 1, wherein
the determining of the target control force under the first condition is carried out by detecting a peak value of an envelope amplitude of a damping rate based on the selected damping coefficient, temporarily holding the peak value that was detected, and determining the target control force based on the peak value that was temporarily held.

9. The suspension control method according to claim 8, wherein
the damping rate is determined using a prescribed damping rate conversion map.

10. The suspension control method according to claim 8, wherein
upon determining the damping rate is in an increasing phase in accordance with the peak value that was detected, the envelope amplitude is determined in accordance with a prescribed increase rate limit value.

11. The suspension control method according to claim 8, wherein
upon determining the peak value that was detected is smaller than a prior peak value, the envelope amplitude is determined in accordance with a prescribed decrease rate limit value.

12. The suspension control method according to claim 8, wherein
upon determining the peak value that was detected is not detected within a prescribed period of time, the envelope amplitude is determined after a prescribed peak hold time has elapsed.

13. The suspension control method according to claim 1, wherein
the sprung mass speed is calculated based on a wheel speed detected by a wheel speed sensor from among the plurality of sensors.

14. The suspension control method according to claim 1, wherein
the sprung mass speed is calculated based on a stroke speed detected by a stroke sensor from among the plurality of sensors.

15. A suspension control system comprising:
a suspension mechanism that is provided between a sprung mass and an unsprung mass and includes an elastic body and a variable damping force damper; and
a control device configured to apply a target control force to the variable damping force damper, the target control force being based on a damping coefficient of the variable damping force damper,
the control device including
a state estimation unit configured to calculate a sprung mass speed of the sprung mass based on a value detected by at least one sensor from among a plurality of sensors,
an application control unit configured to calculate a current damping coefficient of the variable damping force damper based on the sprung mass speed,
a selection unit configured to select a prior damping coefficient as a selected damping coefficient upon determining that a first condition is satisfied, and select the current damping coefficient as the selected damping coefficient upon determining that the first condition is not satisfied,
a target control amount management unit configured to determine a target control force based on the selected damping coefficient, and
a damping coefficient holding unit configured to temporarily hold the current damping coefficient as the prior damping coefficient to be used in a subsequent control cycle.

* * * * *

UNITED STATES PATENT AND TRADEMARK OFFICE
CERTIFICATE OF CORRECTION

PATENT NO. : 11,433,729 B2
APPLICATION NO. : 17/439430
DATED : September 6, 2022
INVENTOR(S) : Hironobu Kikuchi It is certified that error appears in the above-identified patent and that said Letters Patent is hereby corrected as shown below:

In the Drawings

1) In each of Figures 6 and 12, replace "KARNOPP'S RULE APPLICATION REGION (FIRST DAMPING FORCE CONTROL MODE)" with "KARNOPP'S RULE NON-APPLICATION REGION (FIRST DAMPING FORCE CONTROL MODE)."

In the Specification

2) In the paragraph at Column 10, Lines 23-30, replace "comparator 712" with "comparator 716."

3) In the last sentence of the paragraph at Column 11, Lines 53-54, replace the term "prescribed increase rate per unit time" with the term "prescribed decrease rate per unit time."

Signed and Sealed this
Twenty-second Day of November, 2022

Katherine Kelly Vidal
*Director of the United States Patent and Trademark Office*